(12) United States Patent
Negro et al.

(10) Patent No.: US 10,325,129 B2
(45) Date of Patent: *Jun. 18, 2019

(54) METHOD AND APPARATUS FOR ORDERING CODE CANDIDATES IN IMAGE FOR DECODING ATTEMPTS

(71) Applicant: COGNEX CORPORATION, Natick, MA (US)

(72) Inventors: James Negro, Arlington, MA (US); John F. Keating, Medway, MA (US); Michael C. Moed, Hopkinton, MA (US)

(73) Assignee: COGNEX CORPORATION, Natick, MA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/700,620

(22) Filed: Sep. 11, 2017

(65) Prior Publication Data
US 2018/0157886 A1 Jun. 7, 2018

Related U.S. Application Data

(63) Continuation of application No. 14/191,695, filed on Feb. 27, 2014, now Pat. No. 9,760,752, which is a (Continued)

(51) Int. Cl.
*G06K 7/10* (2006.01)
*G06K 7/14* (2006.01)

(52) U.S. Cl.
CPC ....... *G06K 7/1465* (2013.01); *G06K 7/10722* (2013.01); *G06K 7/10762* (2013.01);
(Continued)

(58) Field of Classification Search
CPC ............ G06K 7/1465; G06K 7/10722; G06K 7/10762; G06K 7/10871; G06K 7/1417; G06K 7/1443
USPC ...... 235/454, 462.01, 462.08, 462.09, 462.1, 235/462.11, 462.31, 462.32, 4, 75, 479, 235/475
See application file for complete search history.

(56) References Cited

U.S. PATENT DOCUMENTS 4,751,375 A 6/1988 Ravizza
4,988,852 A 1/1991 Krishnan
(Continued)

*Primary Examiner* — Paultep Savusdiphol
(74) *Attorney, Agent, or Firm* — Quarles & Brady LLP

(57) ABSTRACT

A method and apparatus for decoding codes applied to objects for use with a camera and a conveyor system wherein the camera includes an image sensor having a two dimensional field of view (FOV) and the conveyor system moves objects through the FOV such that objects enter the FOV along an entry edge and exit the FOV along an exit edge, the method comprising the steps of providing a processor programmed to perform the steps of obtaining images of the FOV, for each image identifying code candidates in at least portions of the image, ordering at least a subset of the code candidates for decoding in a candidate order wherein the candidate order is determined at least in part as a function of the first direction of travel through the FOV, attempting to decode code candidates in the order specified by the direction of travel and when a new image event occurs, foregoing attempts to decode at least a portion of the identified code candidates.

19 Claims, 8 Drawing Sheets

Related U.S. Application Data continuation of application No. 13/288,104, filed on Nov. 3, 2011, now Pat. No. 8,740,081.

(52) U.S. Cl.
CPC ....... *G06K 7/10871* (2013.01); *G06K 7/1417* (2013.01); *G06K 7/1443* (2013.01)

(56) References Cited

U.S. PATENT DOCUMENTS

| | | | |
|---|---|---|---|
| 5,512,739 A | 4/1996 | Chandler et al. | |
| 5,592,228 A | 1/1997 | Dachiku et al. | |
| 5,698,833 A * | 12/1997 | Skinger | G06K 7/1093 235/462.09 |
| 5,770,841 A * | 6/1998 | Moed | B07C 3/00 235/375 |
| 5,770,848 A * | 6/1998 | Oizumi | G06K 7/10831 235/383 |
| 6,494,375 B1 | 12/2002 | Ishibashi et al. | |
| 6,778,683 B1 * | 8/2004 | Bonner | G06K 9/00973 209/584 |
| 6,880,758 B2 | 4/2005 | Park et al. | |
| 7,104,453 B1 * | 9/2006 | Zhu | B82Y 15/00 235/375 |
| 7,121,469 B2 | 10/2006 | Dorai et al. | |
| 7,181,066 B1 | 2/2007 | Wagman et al. | |
| 7,199,385 B2 | 4/2007 | Wehrle et al. | |
| 7,254,665 B2 | 8/2007 | Yee | |
| 7,331,523 B2 | 2/2008 | Meier et al. | |
| 7,392,951 B2 * | 7/2008 | Ray | G06K 7/10851 235/462.01 |
| 7,466,868 B2 | 12/2008 | Wilensky | |
| 7,545,949 B2 | 6/2009 | Mirtich et al. | |
| 7,646,887 B2 | 1/2010 | Goncalves et al. | |
| 7,721,964 B2 * | 5/2010 | Reichenbach | B07C 3/14 235/454 |
| 7,852,519 B2 | 12/2010 | Meier et al. | |
| 8,542,930 B1 | 9/2013 | Negro et al. | |
| 2001/0006191 A1 * | 7/2001 | Hecht | G06K 7/14 235/462.16 |
| 2002/0057852 A1 | 5/2002 | Durbin et al. | |
| 2006/0076415 A1 * | 4/2006 | Reichenbach | B07C 3/14 235/454 |
| 2006/0091219 A1 | 5/2006 | Joseph et al. | |
| 2006/0261167 A1 * | 11/2006 | Ray | G06K 7/10851 235/462.08 |
| 2007/0014542 A1 | 1/2007 | Poulsen | |
| 2008/0029599 A1 * | 2/2008 | Tskos | B82Y 15/00 235/462.01 |
| 2009/0095047 A1 * | 4/2009 | Patel | G06K 7/10722 73/1.01 |
| 2010/0200660 A1 | 8/2010 | Moed et al. | |
| 2011/0075156 A1 | 3/2011 | Patel et al. | |

\* cited by examiner

METHOD AND APPARATUS FOR ORDERING CODE CANDIDATES IN IMAGE FOR DECODING ATTEMPTS

CROSS-REFERENCE TO RELATED APPLICATIONS

This application is a continuation of U.S. application Ser. No. 14/191,695, which is titled "Method and Apparatus for Ordering Code Candidates in Image for Decoding Attempts," and was filed on Feb. 27, 2014, which is itself a continuation of U.S. application Ser. No. 13/288,104, which is titled "Method and Apparatus for Ordering Code Candidates in Image for Decoding Attempts," was filed on Nov. 3, 2011, and has issued as U.S. Pat. No. 8,740,081. The entire contents of both of the above applications are hereby incorporated herein by reference.

STATEMENT REGARDING FEDERALLY SPONSORED RESEARCH OR DEVELOPMENT

Not applicable.

BACKGROUND OF THE INVENTION

The present invention relates to code readers and more specifically to code readers that attempt to optimize decode processes to decode code candidates in a rapid succession of obtained images.

Automated identification of products using optical codes has been broadly implemented throughout industrial operations and in many other applications for many years. Optical codes are patterns composed of elements with different light reflectance or emission, assembled in accordance with pre-defined rules. The elements in the optical codes may be bars or spaces in a linear barcode, or the on/off pattern in a two-dimensional matrix code. The bar code or symbols can be printed on labels placed on product packaging, or directly on the product itself by direct part marking. The information encoded in a bar code or symbol can be decoded using optical readers in fixed-mount installations or in portable hand held devices. In the case of a fixed-mount device, often a transfer line or the like is provided that moves objects marked with codes or symbols by a device detector so that the detector can generate images of the codes.

At least some reader devices include a camera capable of generating two dimensional images of a field of view. For example, many systems currently employ a two dimensional CCD image sensor which obtains images and generates image data which is provided to a processor. The processor is programmed to examine image data to identify code candidates (e.g., bar code or symbol candidates) and attempt to decode the code candidates. At least some reader devices are programmed to obtain images of a FOV in rapid succession and to attempt to decode any code candidates in the obtained images as quickly as possible. To decode codes, the processor runs one or more decode algorithms.

Where objects are moved through a device's FOV via a transfer line or the like as images are obtained, in many cases a large number of images of the same object and applied code are obtained with the object and code in different locations along the direction of travel through the FOV. Here, some code candidates in an image will be new to the FOV (i.e., the candidates were located outside the FOV during previous images) and some will be exiting the FOV prior to generation of a subsequent image.

When obtaining an image of a code, the quality of the image depends on several factors including the angle of a sensor with respect to a surface on which the code is applied, the material and texture of the surface on which the code is applied, code marking quality or damage after marking, ambient and device lighting characteristics, distortion in the applied symbol, transfer line speed, distance from the surface on which the code is applied, optical blur, camera resolution, etc. Image quality affects the ability of a processor running a specific algorithm to decode a code. For example, in many cases a simple decoding algorithm will not be able to successfully decode codes in an image unless the circumstances surrounding image acquisition are substantially ideal.

To compensate for imperfect image acquisition, relatively more complex decode algorithms have been developed. For instance, several decode algorithms have been developed which can at least partially compensate for imperfect lighting, a curved surface that a code is applied to, imperfect sensor angle with respect to the surface that a code is applied to, etc.

While complex decode algorithms work well to compensate for imperfect images, one drawback is that complex algorithms often require a greater amount of processing power and a commensurate greater amount of time to perform. While more expensive algorithms are not an issue in some applications, in applications where images are obtained in rapid succession, expensive algorithms requiring long periods to complete can result in computational requirements that far exceed capabilities of reader processors. More specifically, in some cases, image sensors are capable of obtaining and providing images so quickly that a reader device processor cannot perform a complex algorithm on all code candidates in an image prior to receiving a next image.

Where a processor cannot keep up with the computational demands required to perform a complex algorithm for all code candidates in a rapid succession of images, one solution may be to forego analysis of candidates in next images until a reader device has attempted to decode all code candidates in a current image. Thus, for instance, where second through fourth images are obtained during the period required to attempt to decode all code candidates in a first image, the second through fourth images would be discarded when a fifth image is obtained and code candidates in the fourth image would be examined. While this solution ensures that the complex algorithm is applied to all candidates in a current or first image, this solution simply ignores code candidates in the second through fourth image while candidates in the first image are processed despite the fact that candidates in the subsequent images may be better suited to be decoded. In this case, the end result may be that some codes that pass through a field of view are never successfully decoded.

BRIEF SUMMARY OF THE INVENTION

It has been recognized that code candidates in obtained images can be ordered in a candidate order for decode attempts as a function various factors including locations of candidates in an image currently being examined, locations of candidates in images previously obtained, the results of decode attempts in previous images, the direction of object/code travel through a field of view, the speed of travel through the field of view, whether or not candidates will likely appear in subsequent images, whether or not candidates are newly located within the field of view, and many other factors. Here, after a candidate order is established, a processor attempts to decode the candidates in the established order until a next image event occurs at which point the processor discards or at least stops attempting to decode candidates in the current image and commences processing of code candidates in the next image. Here, the next image event may be reception of a next image, the end of a timeout period, completion of a number of decode attempts selected to be able to be completed prior to the anticipated reception of a next image, completion of decoding attempts for all code candidates that likely have not been decoded in previous images, etc.

For instance, in at least some embodiments where a transfer line moves objects/codes through a device field of view in a direction of travel so that new images enter the field of view along an entry edge and exit along an exit edge, the processor may be programmed to order code candidates in obtained images so that the processor attempts to decode candidates closest to the entry edge first followed by candidates more distant from the entry edge until either the processor has attempted to decode all of the candidates or a next image event (e.g., a next image is obtained) occurs. When a next image event occurs prior to attempting to decode all candidates, the processor discards or foregoes processing candidates that the processor has not yet started to attempt to decode and, in at least some cases, may stop decoding candidates currently being decoded, and starts to process the next image.

As another instance, the processor may be programmed to order code candidates in obtained images so that the processor attempts to decode candidates closest to the exit edge first followed by candidates more distant from the exit edge until either the processor has attempted to decode all of the candidates or a next image event (e.g., a next image is obtained) occurs. In still other cases the processor may divide the FOV into different regions of interest (ROIs) and then attempt to decode candidates in the ROIs in a sequential order starting with candidates in a first ROI, followed by a second ROI and so on until all candidates have been attempted or until a next image event occurs.

In still other embodiments the processor may be programmed to identify candidates that likely will not appear in a next image based on travel direction, speed and locations of candidates in a current image or any subset of these factors and may order the candidates so that candidates that likely will not appear in a next image are processed early in the order.

In other embodiments the processor may be programmed to keep track of locations of successfully decoded candidates in prior images and to order candidates for decode attempts as a function of which code candidates in a current image were likely successfully decoded in prior images and which were not. For example, where two of ten candidates in a current image likely correspond to two successfully decoded candidates from prior images, the processor may order the other eight candidates first and only attempt to decode the two likely previously successfully decoded candidates last if there is time prior to obtaining a next image.

In yet other embodiments the processor may order candidates as a function of both whether or not the candidates will likely appear in subsequent images and whether or not the candidates were likely decoded in prior images as well as based on location of candidates in an image or other factors.

Some embodiments include a method for decoding codes applied to objects for use with a camera and a conveyor system wherein the camera includes an image sensor having a two dimensional field of view (FOV) and the conveyor system moves objects in a first direction of travel through the FOV such that objects enter the FOV along an entry edge and exit the FOV along an exit edge, the method comprising the steps of providing a processor programmed to perform the steps of, obtaining images of the FOV, for each image, identifying code candidates in at least portions of the image, ordering at least a subset of the code candidates for decoding in a candidate order wherein the candidate order is determined at least in part as a function of the first direction of travel through the FOV, attempting to decode code candidates in the order specified by the direction of travel and when a new image event occurs, foregoing attempts to decode at least a portion of the identified code candidates.

In some embodiments the step of ordering at least a subset of code candidates includes identifying at least first and second regions of interest (ROIs) in the FOV that are adjacent the entry edge and the exit edge of the FOV, respectively, identifying code candidates in each of the at least first and second ROIs, and ordering the code candidates in one of the first and second ROIs for processing prior to the code candidates in the other of the first and second ROIs. In some embodiments the code candidates in the first ROI are ordered prior to the code candidates in the second ROI in the candidate order. In some embodiments the code candidates in the second ROI are ordered prior to the code candidates in the first ROI in the candidate order.

In some embodiments the step of ordering at least a subset of the code candidates further includes the step of identifying code candidates that will likely be outside the FOV when a next image is obtained and ordering the code candidates that will likely be outside the FOV when the next image is obtained near the beginning of the candidate order. In some cases the step of identifying code candidates that will likely be outside the FOV further includes the step of, for code candidates that will likely be outside the FOV when the next image is obtained, identifying code candidates that have likely been decoded in prior images and code candidates that likely have not been decoded in prior images and ordering the code candidates that likely have not been decoded in prior images prior to the code candidates that have likely been decoded in prior images.

In some cases the step of ordering at least a subset of the code candidates further includes the steps of identifying code candidates that are likely new to the FOV and identifying code candidates that were likely in a prior image and that will likely be in the FOV when a subsequent image is obtained and ordering the code candidates that were likely in a prior image and that will likely be in the FOV when the subsequent image is obtained near the end of the candidate order and the code candidates that were likely in a prior image generally near the middle of the candidate order.

In some embodiments the step of ordering at least a subset of the code candidates includes identifying code candidates that likely are new to the FOV near the beginning of the candidate order. In some embodiments the step of ordering at least a subset of the code candidates includes, identifying code candidates that are likely to be outside the FOV when a next image is obtained and that have likely not been decoded in a prior image as a first candidate subset, identifying code candidates that are likely to be outside the FOV when a next image is obtained and that have likely been decoded in a prior image as a second candidate subset, identifying code candidates that are likely to be in the FOV when a next image is obtained and that have likely not been decoded in a prior image as a third candidate subset, identifying code candidates that are likely to be in the FOV when a next image is obtained and that have likely been decoded in a prior image as a fourth candidate subset and ordering the subsets so that the first candidate subset occurs prior to the second candidate subset, the second candidate subset occurs prior to the third candidate subset and the third candidate subset occurs prior to the fourth candidate subset.

In some cases, when a new image is obtained, the method further includes discarding code candidates in the candidate order for which no attempt to decode has occurred. In some cases the conveyor system conveys objects in the first direction of travel at a conveyor speed and wherein the candidate order is determined at least in part as a function of the conveyor speed. In some embodiments at least first and second different decode algorithms may be used to attempt to decode any of the code candidates, the method further including the step of assigning one of the first and second decode algorithms to each of at least a subset of the code candidates in the candidate order wherein the algorithm assigned to each candidate is at least in part a function of the candidate order.

Some embodiments further include the steps of identifying code candidates that were likely successfully decoded in prior images and code candidates that were likely not successfully decoded in prior images, the step of assigning first and second decode algorithms including assigning the decode algorithms at least in part as a function of whether or not code candidates were likely decoded in a prior image.

In some embodiments the first decode algorithm requires more time than the second decode algorithm to complete. In some cases a new image event occurs when a new image is obtained. In some embodiments a new image event occurs when an image acquisition period has lapsed.

A method for decoding codes applied to objects for use with a camera and a conveyor system wherein the camera includes an image sensor having a two dimensional field of view (FOV) and the conveyor system moves objects in a first direction of travel through the FOV such that objects enter the FOV along an entry edge and exit the FOV along an exit edge, the method comprising the steps of, providing a processor programmed to perform the steps of, identifying the first direction of travel through the FOV, obtaining images of the FOV, for each image, where an image most recently obtained is a current image, identifying code candidates in at least portions of the image, attempting to decode code candidates that are proximate the exit edge of the FOV, after attempting to decode code candidates that are proximate the exit edge of the FOV, attempting to decode code candidates that are proximate the entry edge of the FOV and when a new image event occurs, foregoing attempts to decode at least a portion of the identified code candidates.

Some embodiments include a method for decoding codes applied to objects for use with a camera and a conveyor system wherein the camera includes an image sensor having a two dimensional field of view (FOV) and the conveyor system moves objects in a first direction through the FOV such that objects enter the FOV along an entry edge and exit the FOV along an exit edge so that the sensor generates images having at least first and second different regions of interest that are adjacent the entry edge and the exit edge, respectively the method comprising the steps of providing a processor programmed to perform the steps of, obtaining an image of the FOV, for each image, identifying code candidates in at least portions of the image, identifying at least first and second different regions of interest (ROIs) in the obtained image, attempting to decode code candidates in the first ROI a first time, after attempting to decode candidates in the first ROI, attempting to decode code candidates in the second ROI, after attempting to decode candidates in the second ROI, attempting a second time to decode code candidates in the first ROI, and when a new image event occurs, foregoing attempts to decode at least a portion of the identified code candidates.

In some embodiments the step of attempting to decode code candidates in the first ROI a first time includes using a first decode algorithm and the step of attempting to decode code candidates in the first ROI a second time includes attempting to decode the code candidates using a second decode algorithm that is different than the first decode algorithm. In some embodiments the first ROI is proximate one of the entry and exit edges of the FOV and the second ROI is proximate the other of the entry and exit edges of the FOV.

Some embodiments further include the step of ordering code candidates within the first ROI in a candidate order, the step of attempting to decode code candidates in the first ROI a first time, including attempting to decode the code candidates in an order prescribed by the candidate order. Some cases further include the step of identifying code candidates in the first ROI that have likely been previously decoded in at least one prior image, the step of ordering the code candidates including order the code candidates at least in part as a function of which candidates have likely been previously decoded in at least one prior image, Other embodiments include an apparatus for decoding codes applied to objects for use with a camera and a conveyor system wherein the camera includes an image sensor having a two dimensional field of view (FOV) and the conveyor system moves objects in a first direction of travel through the FOV such that objects enter the FOV along an entry edge and exit the FOV along an exit edge, the apparatus comprising a processor programmed to perform the steps of, obtaining images of the FOV, for each image, identifying code candidates in at least portions of the image, ordering at least a subset of the code candidates for decoding in a candidate order wherein the candidate order is determined at least in part as a function of the first direction of travel through the FOV, attempting to decode code candidates in the order specified by the direction of travel, and when a new image event occurs, foregoing attempts to decode at least a portion of the identified code candidates.

In some embodiments the processor is programmed to perform the step of ordering at least a subset of code candidates by identifying at least first and second regions of interest (ROIs) in the FOV that are adjacent the entry edge and the exit edge of the FOV, respectively, identifying code candidates in each of the at least first and second ROIs, and ordering the code candidates in one of the first and second ROIs for processing prior to the code candidates in the other of the first and second ROIs.

In some embodiments the processor is programmed to perform the step of ordering at least a subset of the code candidates by identifying code candidates that will likely be outside the FOV when a next image is obtained and ordering the code candidates that will likely be outside the FOV when the next image is obtained near the beginning of the candidate order. In some embodiments the processor is programmed to perform the step of ordering at least a subset of the code candidates by identifying code candidates that likely are new to the FOV near the beginning of the candidate order.

Still other embodiments include an apparatus for decoding codes applied to objects for use with a camera and a conveyor system wherein the camera includes an image sensor having a two dimensional field of view (FOV) and the conveyor system moves objects in a first direction of travel through the FOV such that objects enter the FOV along an entry edge and exit the FOV along an exit edge, the apparatus comprising a processor programmed to perform the steps of identifying the first direction of travel through the FOV, obtaining images of the FOV, for each image, where an image most recently obtained is a current image, identifying code candidates in at least portions of the image, attempting to decode code candidates that are proximate the exit edge of the FOV, after attempting to decode code candidates that are proximate the exit edge of the FOV, attempting to decode code candidates that are proximate the entry edge of the FOV and when a new image event occurs, foregoing attempts to decode at least a portion of the identified code candidates.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
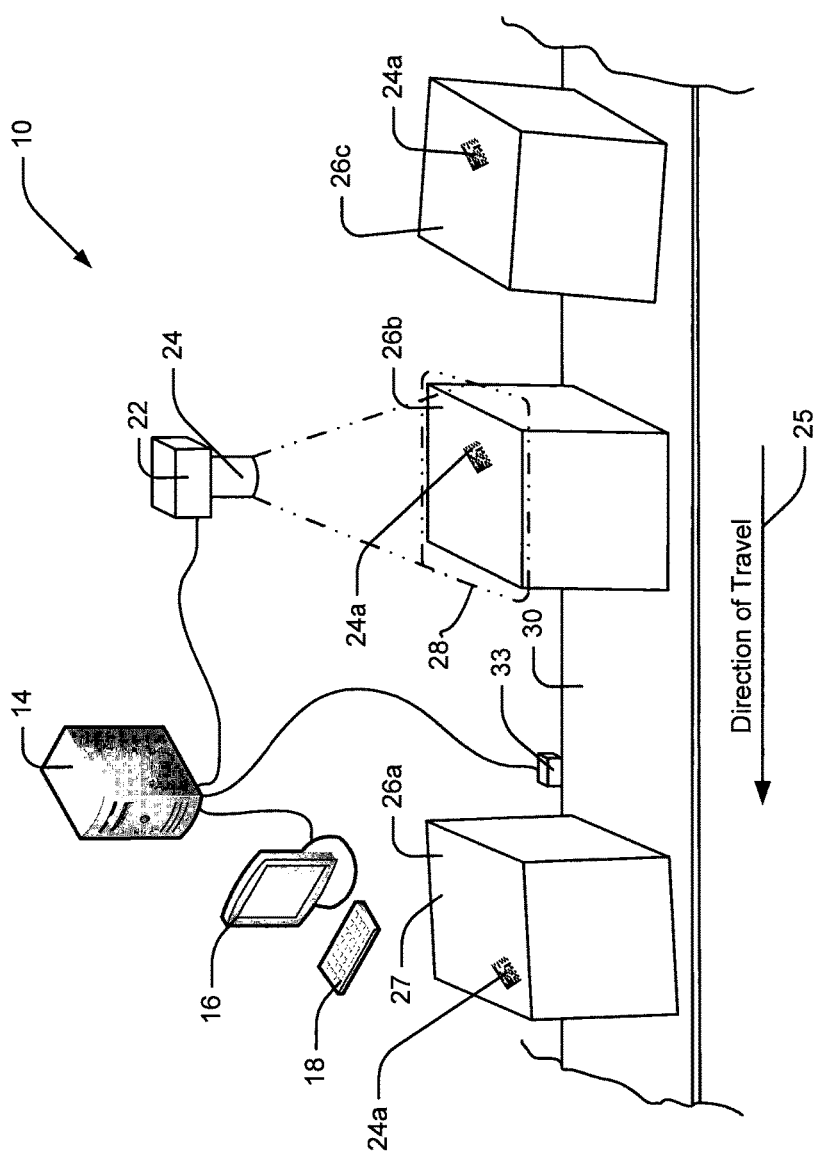
FIG. 1 is a schematic diagram illustrating a machine vision system and a transfer line where the machine vision system includes features consistent with at least some aspects of the present invention.

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present invention will be described in the context of an exemplary imaging system/transfer line 10 wherein a transfer line 30 moves objects 26a, 26b, 26c, etc., along a direction of travel 25. In the present example, each of the objects has similar physical characteristics and therefore, only object 26b will be described in any detail. Specifically, object 26b includes a surface 27 which faces generally upward as object 26b is moved by transfer line 30. A matrix code 24a is applied to top surface 27 for identification purposes. Similar matrix codes 24a are applied to top surfaces of each of objects 26a and 26c.

Referring still to FIG. 1, the image processing system includes a camera 22 including optics 24 that define a field of view 28 below the camera 22 through which transfer line 30 moves the objects 26a, 26b, 26c, etc. Thus, as the objects move along direction of travel 25, each of the top surfaces 27 comes into field of view 28. Field of view 28 is large enough in the present example that the entire top surface 27 is located at one point or another within the field of view 28 and therefore any code applied to the top surface 27 of an object passes through the field of view 28 and can be captured in an image by camera 22. The imaging system also includes a computer or processor 14 (or multiple processors) which receives images from camera 22, examines the images to identify subportions of the images that may include an instance of a matrix code as code candidates and then attempts to decode each code candidate in an effort to identify the object currently within the field of view 28. To this end, camera 22 is linked to processor 14. An interface device 16/18 is also linked to processor 14 to provide visual and audio output to a system user as well as for the user to provide input to control the imaging system, set imaging system operating parameters, trouble shoot imaging system problems, etc. In at least some embodiments, the imaging system also includes a tachometer 33 positioned adjacent transfer line 30 which may be used to identify direction of travel 25 and/or the speed at which transfer line 30 transfers objects through the field of view.

Figure 2:
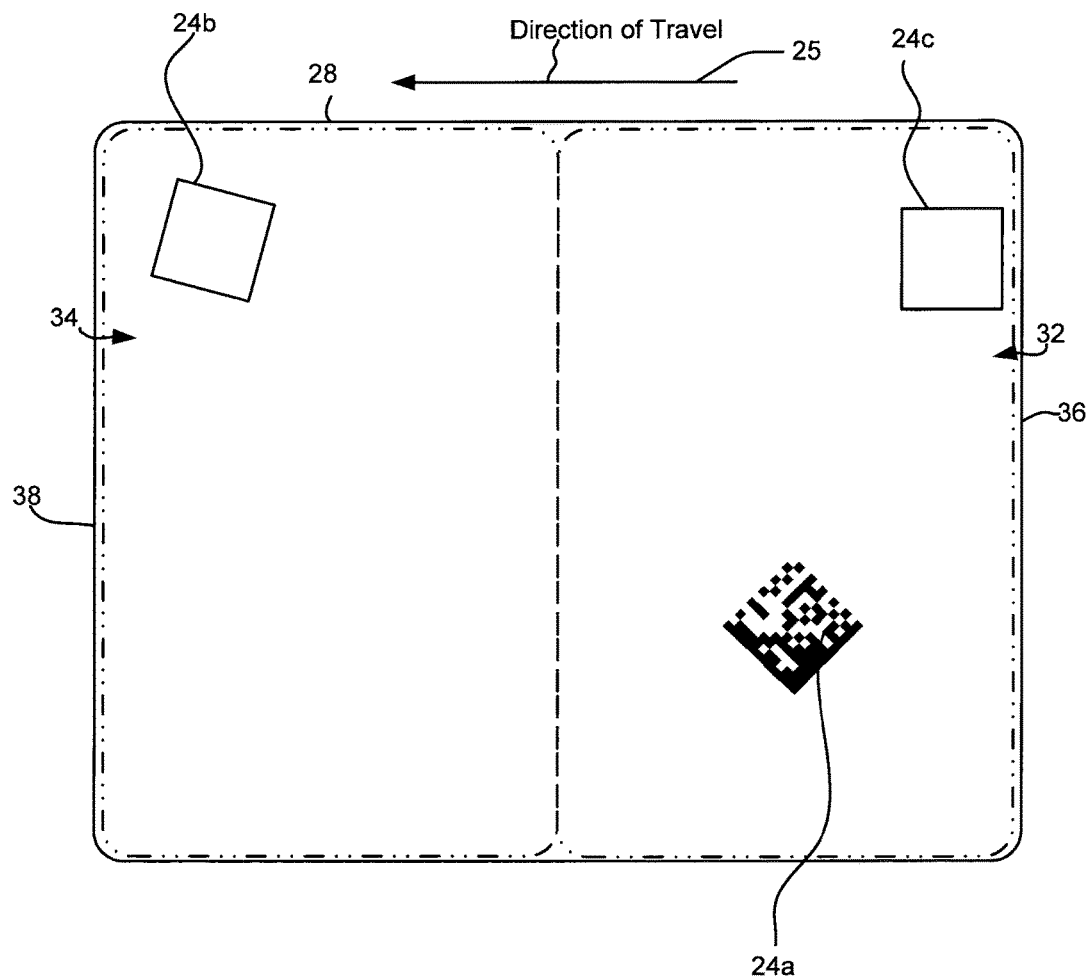
FIG. 2 illustrates an exemplary field of view, exemplary regions of interest within the field of view and exemplary code candidates within the field of view.

Referring now to FIG. 2, an exemplary image of the field of view 28 is illustrated. Within the field of view 28, as shown, there are three code candidates 24a, 24b, and 24c wherein only code candidate 24a corresponds to an actual matrix code. Thus, code candidates 24b and 24c simply represent image artifacts that, upon an initial analysis of the image, have some characteristics that are consistent with the artifacts being actual matrix codes to be decoded. The direction of travel 25 of the transfer line 30 shown in FIG. 1 is shown in FIG. 2 as being from right to left as illustrated. Thus, objects and codes marked thereon entering the field of view 28 enter the field of view from the right and pass to the left. For this reason, the right edge 36 of field of view 28 is referred to as an entry edge while the left edge 38 is referred to as an exit edge.

Referring again to FIGS. 1 and 2, camera 22 is a high speed camera that obtains consecutive images of field of view 28 extremely quickly such that, in many cases, as a code on an object moves through the field of view 28, the camera 22 will obtain a large number of consecutive images of the code at different locations between the entry and exit edges 36 and 38, respectively. Thus, for instance, camera 22 may obtain 20 separate images with code 24a appearing in each of the 20 images as code 24a moves across the field of view 28. While processor 14 is a high speed processor, in many cases, processor 14 is unable to process all of the data in all of the consecutive images generated by camera 22. This is particularly true where a large number of false code candidates appear within obtained images and the number of false code candidates within images will often be a function of the circumstances under which the images are obtained. For example, where field of view lighting is imperfect, the number of false code candidates may be greater. As another example, the speed with which transfer line 30 moves the object through the field of view 28 may affect the number of false code candidates identified. In the present explanation it will be assumed that in many cases camera 22 generates images so rapidly that processor 14 cannot process all code candidates in all of the obtained images at least some of the time.

Figure 3:
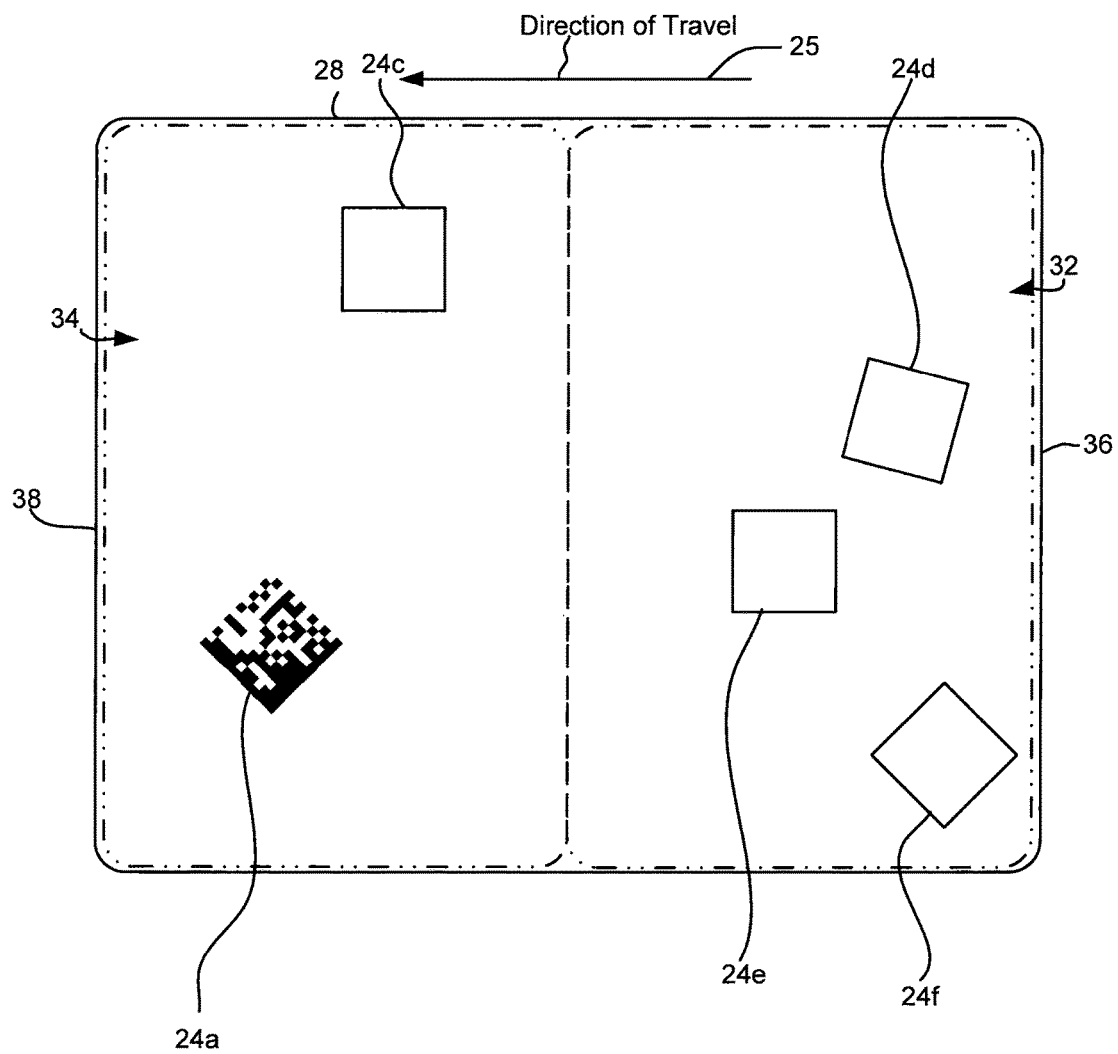
FIG. 3 is similar to FIG. 2, albeit showing the code candidates in different relative positions with respect to the field of view and the regions of interest.

It has been recognized that system processor 14 will have attempted to decode many of the code candidates within an obtained image in prior images at least once and in many cases several times. For example, referring once again to FIG. 2 and now also to FIG. 3, FIG. 3 shows the field of view 28 at a point and time shortly after the image shown in FIG. 2 was obtained where code candidate 24c has moved along the direction of travel 25 within the field of view 28 to a different location. Similarly, candidate 24a has moved along the direction of travel within the field of view 28. Candidate 24b has moved out of the field of view 28 and therefore does not appear within FIG. 3. At the instant when the image in FIG. 3 is obtained, because candidates 24a and 24c appeared within the image shown in FIG. 2 and likely within many other images obtained between the times when the images in FIGS. 2 and 3 were obtained, it is likely that processor 14 has already attempted to decode each of candidates 24a and 24c at least once and in many cases several times.

Referring still to FIG. 3, three additional code candidates 24d, 24e and 24f appear within the image that did not appear within the image shown in FIG. 2. Here, the artifacts that result in candidates 24d-24f have moved to locations within the field of view 28 between the times when the images in FIGS. 2 and 3 were obtained. In this case, processor 14 may not have attempted to decode any of the candidates 24d-24f in prior images or, at a minimum, may have only attempted to decode each one of the relatively newer candidates within the field of view a smaller number of times than the number of times the processor attempted to decode the relatively older candidates 24a and 24c. Whether or not the processor 14 has attempted to decode candidates within an obtained image of the field of view 28 is a function of the direction of travel 25, the speed at which the transfer line 30 (see again FIG. 1) moves objects and codes marked thereon through the field of view 28, the speed with which the imaging system obtains images and the speed with which the processor decodes the candidates obtained.

Thus, in at least some embodiments, processor 14 may be programmed to effectively order code candidates within an obtained image for decoding in a candidate order where candidates new to the field of view 28 are attempted first followed by candidates that have been within the field of view 28 for a relatively longer period of time.

Figure 4:
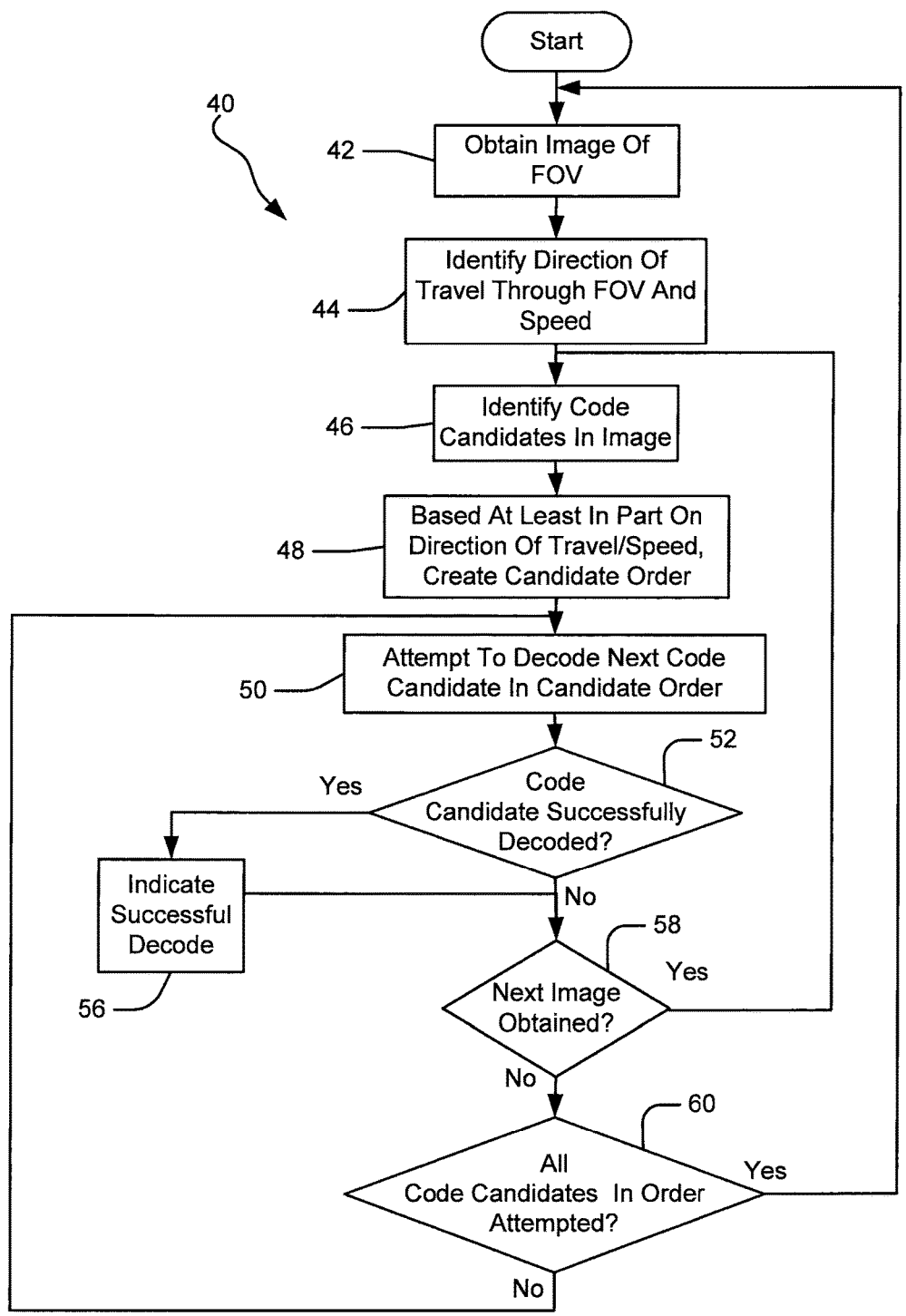
FIG. 4 is a flow chart illustrating a method whereby code candidates within an obtained image are ordered for attempts to decode as a function of the direction of travel and travel speed of the candidates through a field of view.

Referring now to FIG. 4, a process 40 that may be performed by processor 14 to order code candidates within an image for decoding attempts where new code candidates within a field of view are processed first is illustrated. At block 42, the processor 14 obtains an image from camera 22. At block 44, processor 14 identifies the direction of travel through the field of view 28 as well as the speed of transfer line 30. Here, transfer line speed and direction of travel may be determined via tachometer 33. In other embodiments, the transfer line speed and direction of travel may be preprogrammed so that no tachometer is necessary. In still other embodiments, processor 14 may further be programmed to control the transfer line speed and direction of travel and therefore may already have that information for processing purposes. Continuing, at block 46, code candidates within the obtained image are identified. At block 48, based at least in part on the direction of travel/speed, processor 14 creates a candidate order wherein, consistent with the comments described above, relatively newer code candidates within the field of view 28 are placed at the front of the candidate order and relatively older candidates are placed near the end of the order.

At block 50, processor 14 attempts to decode a next code candidate in the candidate order. The first time through block 50 for an image, processor attempts to decode the first code candidate within the candidate order, the second time through block 50 for an image, processor 14 attempts to decode the second code candidate within the order, and so on. At block 52, processor 14 determines whether or not the code candidate was successfully decoded. Where a code candidate has been successfully decoded, control passes to block 56 where processor 14 indicates that the decode attempt has been successful after which control passes to block 58.

Referring again to block 52, where the code candidate has not been successfully decoded, control passes to block 58. At block 58, processor 14 determines whether or not a next image has been obtained. Where a next image has been obtained, control passes back up to block 46 where processor 14 again identifies all code candidates within the obtained image and the process described above continues. Here, it should be appreciated that when a next image is obtained at block 58 prior to processor 14 attempting to decode all of the code candidates within the current image, candidates that the processor has not yet attempted to decode, in at least some embodiments, are simply discarded. Thus, for example, referring again to FIG. 3, it may be that processor 14 only has time to attempt to decode the relatively new images 24*d*, 24*e* and 24*f* prior to the processor 14 obtaining a next image in which case candidates 24*a* and 24*c* in FIG. 3 would be discarded. Here, it should be recognized that processor 14 likely has attempted to decode each of candidates 24*a* and 24*c* several times in prior images when those candidates appeared earlier in the candidate order.

In at least some embodiments, processor 14 may be programmed to, when a next image is obtained, stop decoding code candidates that the processor is currently attempting to decode. In other embodiments, where the processor is substantially done performing a decode algorithm, the processor may continue the current decoding process until complete.

Referring once again to FIG. 4, where a next image has not been obtained at block 58, control passes down to block 60 where processor 14 determines whether or not all of the code candidates in the order have been attempted. Where the processor has not attempted to decode all of the code candidates in the order, control passes back up to block 50 where the processor attempts to decode the next code candidate in the candidate order. In some cases the processor may be able to attempt all code candidates in the order for a specific image. In this case, at block 60, control passes back up to block 42 where the processor 14 waits to obtain the next image of the field of view 28.

Consistent with another aspect of at least some embodiments of the present invention, it has been recognized that in any image of the field of view 28, at least some of the code candidates within the image will likely not appear in subsequent images and that, therefore, it may be advantageous to place code candidates that will likely not appear in subsequent images at the top or at least closer to the top of the candidate order. For example, referring again to FIG. 2, candidate 24*b* is proximate exit edge 38 of field of view 28 and therefore, is relatively more likely than candidates 24*a* and 24*c* to not appear in a subsequent image of the field of view 28. To this end, see also FIG. 3 where candidates 24*a* and 24*c* appear in a subsequent image while candidate 24*b* no longer appears within the image. Here, the image shown in FIG. 2 may represent the last possible instance of candidate 24*b* for which a decode attempt can be made.

Thus, referring again to FIG. 4, in at least some embodiment, the candidate order created at block 48 will place code candidates within a field of view that likely will not appear in subsequent images at the top of the candidate order and new candidates within the field of view 28 later in the order. In FIG. 2, for instance, this would mean that the candidates 24*a* through 24*c* would be ordered 24*b*, 24*a* and 24*c*. Other than the candidate order being different, the process 40 described with respect to FIG. 4 would be performed in the fashion described above.

In some embodiments, instead of generating a candidate order, the field of view may be divided into different regions of interest and code candidates within the different regions may be processed in an order that is a function of which region of interest they appear in. For example, referring once again to FIG. 2, field of view 28 is shown divided into first and second regions of interest 32 and 34, respectively, where the first region of interest 32 includes the first half of the field of view 28 which is adjacent or proximate the entry edge 36 and the second region of interest 34 includes the second half of the field of view 28 which is adjacent or proximate the exit edge 38. Here, in embodiments where code candidates that are relatively new to the field of view 28 should be processed first, processor 14 may attempt to decode candidates in the first region of interest 32 prior to attempting to decode candidates in the second region 34. Similarly, in embodiments where code candidates that are more likely to not appear in subsequent images should be processed first, processor 14 would process candidates in the second region of interest 34 prior to processing any candidates in the first region of interest 32.

Figure 5:
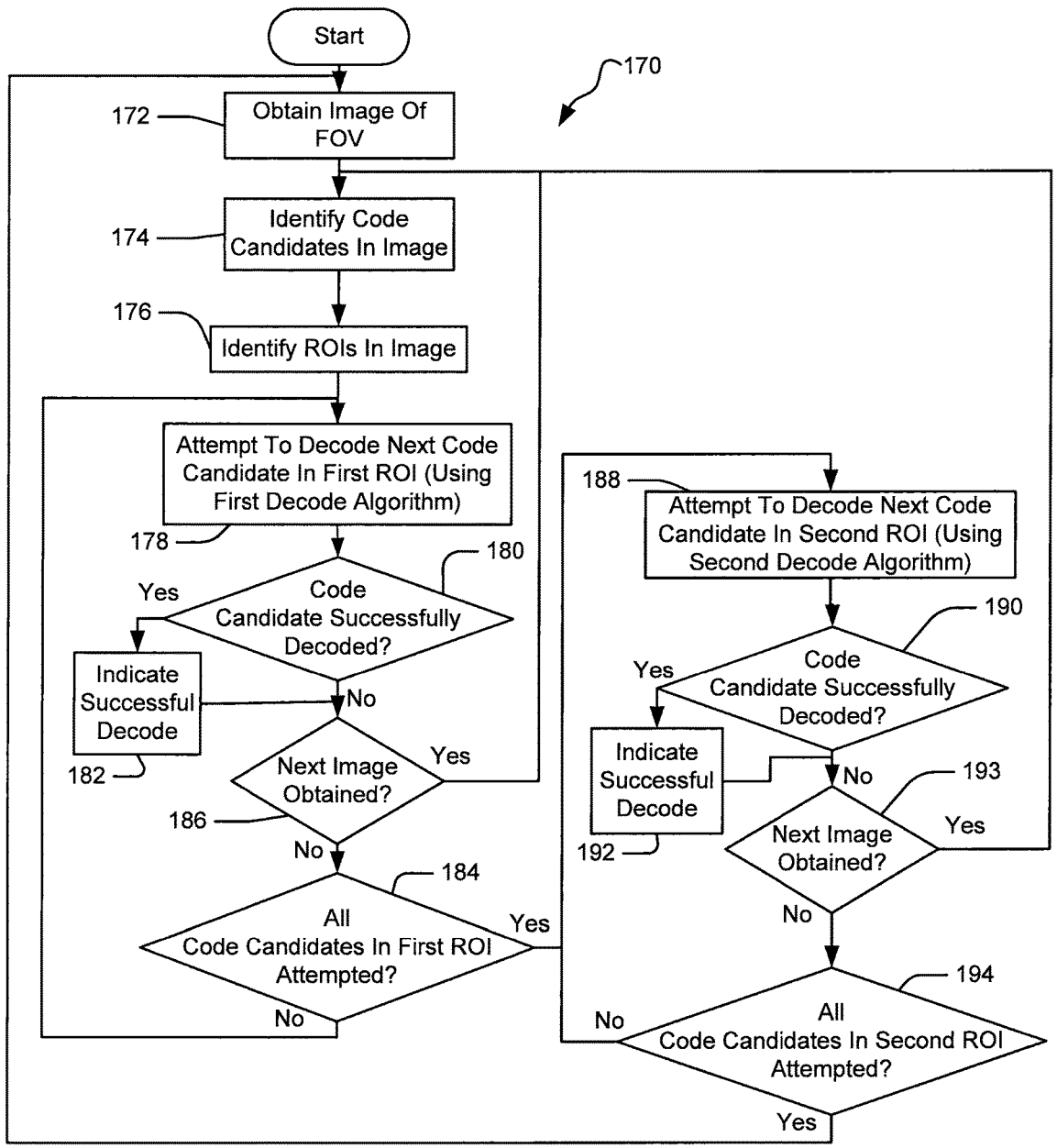
FIG. 5 is a flow chart illustrating a method whereby code candidates in an obtained image are grouped into subsets as a function of which region of interest within a field of view they appear in and whereby a processor processes the code candidates in an order related to their regions of interest.

Referring now to FIG. 5, an exemplary process 170 where processor 14 processes code candidates as a function of which region of interest within a field of view the candidates appear in is illustrated. At block 172, processor 14 obtains an image of the field of view 28. At block 174, code candidates within the obtained image are identified. At block 176, processor 14 identifies regions of interest within the image. Referring again to FIG. 2, in the FIG. 2 example, processor 14, in at least some embodiments, identifies the first and second regions of interest 32 and 34, respectively. At block 178, processor 14 attempts to decode the next code candidate in the first region of interest 32. Here, the first time through block 178 for an image, processor 14 attempts to decode the first code candidate within the first region of interest 32, the second time through block 178, processor 14 attempts to decode a second code candidate within the region of interest 32, and so on. At block 180, processor 14 determines whether or not the code candidate has been successfully decoded. Where the code candidate has been successfully decoded, control passes to block 182 where processor 14 indicates a successful decode after which control passes to block 186. At decision block 180, if the code candidate has not been successfully decoded, control passes to block 186.

Referring still to FIG. 5, at block 186, processor 14 determines whether or not the processor 14 has received a next image from camera 22. Where a next image has been received, control passes back up to block 174 where processor 14 identifies code candidates in the new image and the process described above continues. Here, it should be appreciated that if a next image is obtained prior to processor 14 having attempted to decode all of the code candidates within the first region of interest 32, the code candidates that the processor has not attempted to decode in the first region of interest are discarded. In addition, all of the code candidates in the second region of interest 34 are also discarded in favor of starting to attempt to decode candidates in the new image. In other embodiments, after a new image is obtained, processor 14 may be programmed to complete decode attempts on any candidates in the first region prior to processing the new or next image.

Referring still to block 186, if a next image has yet to be obtained, control passes to block 184. At block 184, processor 14 determines whether or not the processor has attempted to decode all of the code candidates in the first region of interest. Where there are additional code candidates that have not been attempted in the first region of interest, control passes back up to block 178 where the process described above continues. Once all of the code candidates for the first region of interest have been attempted, control passes to block 188 where processor 14 next attempts to decode the next code candidate in the second region of interest. Here, the first time through block 188 for an image, processor 14 attempts to decode a first code candidate in the second region of interest 34, the second time through block 188, processor 14 attempts to decode a second code candidate in the region of interest, and so on.

Referring again to FIG. 5, at block 190, processor 14 determines whether or not a code candidate has been successfully decoded. Where the candidate has been successfully decoded, control passes to block 192 where processor 14 indicates a successful decode. After block 192 control passes to block 193. Where the code candidate has not been successfully decoded at block 190, control passes down to block 193. At block 193 processor 14 determines whether or not a next image has been obtained. Where a next image has been obtained, control passes back up to block 174 where the process described above continues. Here, again, it should be appreciated that if a next image is obtained prior to the processor attempting to decode all of the code candidates in the second region of interest 34, the code candidates that have not been attempted are discarded.

Referring again to block 193, if a next image has not yet been obtained, control passes down to block 194 where processor 14 determines whether or not the processor has attempted to decode all of the code candidates in the second region of interest. Where there is at least one code candidate in the second region of interest that has not been attempted, control passes back up to block 188 where the process described above continues. Once all of the code candidates in the second region of interest have been attempted, control passes back up to block 172 where processor 14 waits to receive a next image from camera 22.

There are many different algorithms that can be used to attempt to decode code candidates within an obtained image. Some of the algorithms are relatively simple while others are relatively complex where the complex decode algorithms often are more successful at decoding candidates than are the simple algorithms. However, in many cases, complex algorithms are extremely computationally intensive and therefore require relatively more time to complete than the simple algorithms. In at least some embodiments it is contemplated that different decode algorithms may be used to attempt to decode code candidates in an image where the decode algorithms to be used may be a function of where codes appear within the obtained image, the direction of travel of code candidates through the field of view, the speed of travel, etc. For example, referring once again to FIG. 2, different decode algorithms may be used to attempt to decode code candidates in the different regions of interest 32 and 34. For instance, in some cases a simple decode algorithm may be used to decode any code candidates within the first region of interest 32 and a second more complex decode algorithm may be used to attempt to decode all code candidates within the second region of interest 34 until a next image is obtained at which point any code candidates that the processor has not yet attempted to decode would be discarded. Consistent with this embodiment, see FIG. 5 where blocks 178 and 188 indicate in brackets that first and second different decoding algorithms, respectively, are used to attempt to decode code candidates in the first and second regions of interest, respectively.

In at least some embodiments, processor 14 may be programmed to associate code candidates in an obtained image with code candidates in previously processed images and more specifically to associate code candidates in obtained images with previously successfully decoded candidates in prior images and may order candidates for attempted decoding as a function of which candidates have likely been previously decoded and which candidates have not likely been previously decoded. To this end, it has been recognized that when a code candidate in an obtained image has likely been previously decoded, another successful decode of that candidate will simply confirm the results of the previous successful decode. In at least some embodiments the processor is programmed to attempt to decode codes that have yet to be successfully decode in previous images prior to attempting to decode codes that have likely previously been decoded.

Figure 6:
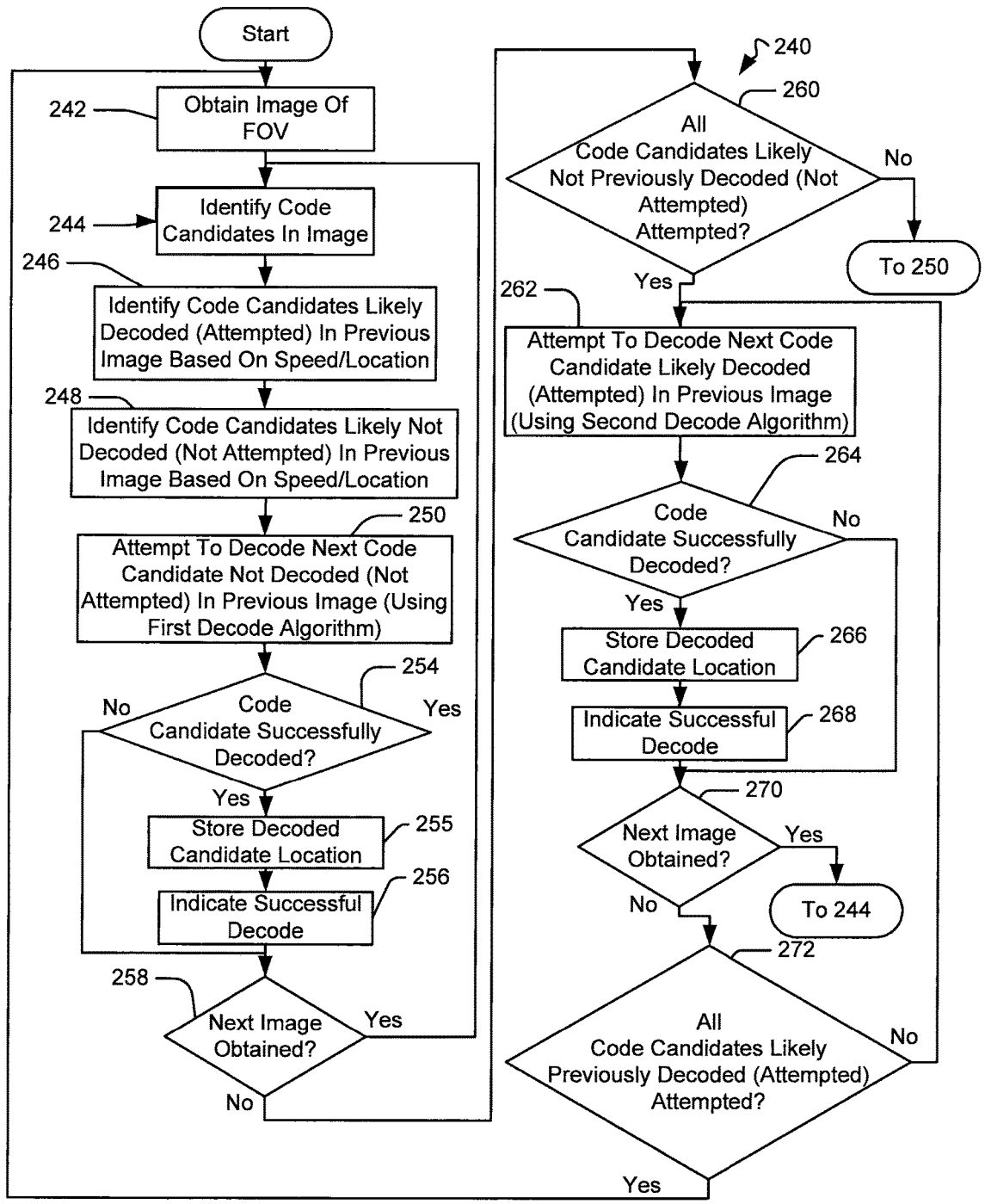
FIG. 6 is a flow chart illustrating a method whereby a processor orders code candidates for decoding attempts as a function of whether or not those candidates were likely decoded in previous images.

Referring now to FIG. 6, a process 240 that may be performed by processor 14 to attempt to decode code candidates as a function of whether or not those code candidates have likely been successfully decoded in previous images is illustrated. At block 242, processor 14 obtains an image of the field of view from camera 22. At block 244, code candidates are identified within the image. At block 246, code candidates that have likely been decoded in previous images are identified based on speed of the transfer line 30, the direction of travel of the transfer line and the locations of the code candidates in previous images and in the current image. At block 248, processor 14 identifies code candidates that have likely not been decoded in previous images based on speed, direction of travel, and locations of candidates in previous images and the current image. At block 252, processor 14 creates a candidate order where candidates likely not attempted in previous images are placed near the top of the order. Here, as above, the order may further be defined by the location of candidates in the current image. For instance, new code candidates that likely have never been identified in prior images may be placed higher in the order than candidates identified in prior images but that were not successfully decoded. At block 250, processor 14 attempts to decode a next code candidate in the order that has likely not been decoded in at least one previous image. At block 254, where the code candidate is successfully decoded, control passes down to block 255 where processor 14 stores the location of the decoded code candidate in a memory for subsequent use at block 246 as described above. After block 255, control passes to block 256 where processor 14 indicates a successful decode after which control passes down to decision block 258. At block 254, where the code candidate is not successfully decoded, control passes down to block 258.

At decision block 258, processor 14 determines whether or not a next image has been obtained from camera 22. Where a next image has been obtained from the camera, control passes back up to block 244 where code candidates in the next image are identified and the process described above continues. At block 258, if a next image has not yet been obtained, control passes up to block 260 where processor 14 determines whether or not the processor has attempted to decode all code candidates that likely have not been decoded in previous images. Where the processor has not attempted to decode all code candidates that were likely not previously decoded in previous images, control passes back to block 250 where processor 14 attempts to decode a next code candidate that was not likely decoded and the process described above continues.

At block 260 if the processor has attempted to decode all code candidates likely not decoded in previous images, control passes down to block 262 where processor 14 attempts to decode a next code candidate that was likely decoded in a previous image. At decision block 264, processor 14 determines whether or not the code candidate has been successfully decoded. Where the code candidate is successfully decoded, control passes to block 266 where processor 14 stores the decoded candidate location and at block 268 processor 14 indicates a successful decode. At block 264, if the code candidate is not successfully decoded, control passes down to block 270.

At block 270, processor 14 determines whether or not a next image has been obtained from camera 22. Where a next image has been obtained, control passes back up to block 244 where the process described above continues. If a next image has not been obtained, control passes down to block 272 where processor 14 determines whether or not the processor has attempted to decode all of the code candidates likely decoded in previous images. Where the processor has attempted all likely previously decoded candidates, control passes back up to block 242 where the process described above continues. If there is at least one more code candidate that the processor has likely decoded in a previous image and that the processor has not attempted to decode in the current image, control passes back up to block 262 where the process described above continues.

Referring still to FIG. 6, in at least some embodiments the decoding algorithms used to attempt to decode likely previously decoded candidates and code candidates that have not likely previously been decoded may be different and selected to optimize the decoding process. For example, for code candidates likely not previously decoded, a first relatively complex decoding algorithm may be used (see brackets in block 250) and for codes that have likely been previously decoded in earlier images, a second relatively simple decoding algorithm may be used to attempt to decode those candidates (see brackets in block 262).

Referring yet again to FIG. 6, while the embodiment described above with respect to FIG. 6 orders code candidates for attempted decoding as a function of whether or not the code candidates likely have been successfully decoded in prior images, in yet other embodiments the code candidates may be ordered as a function of whether or not the processor has likely attempted to decode the candidates or not. For example, where a processor has attempted to decode a first code candidate in a prior image and has not attempted to decode a second code candidate in a prior image, the processor 14 may attempt to decode the second code candidate prior to the first code candidate irrespective of whether or not the attempt to decode the first code candidate in the prior image was successful. In other embodiments, given the same circumstances, the processor may be programmed to attempt to decode the first code candidate prior to the second. To this end, blocks 246, 248, 250, 260, 262 and 272 each include one of the qualifiers (attempted) or (not attempted) which may be substituted for the phrases "likely decoded" and "likely not decoded", respectively, in those blocks. When FIG. 6 is modified in this manner, the process 240 corresponds to a system wherein processor 14 is programmed to order decode attempts as a function of whether or not the processor has likely attempted to decode code candidates in prior images.

Figure 7:
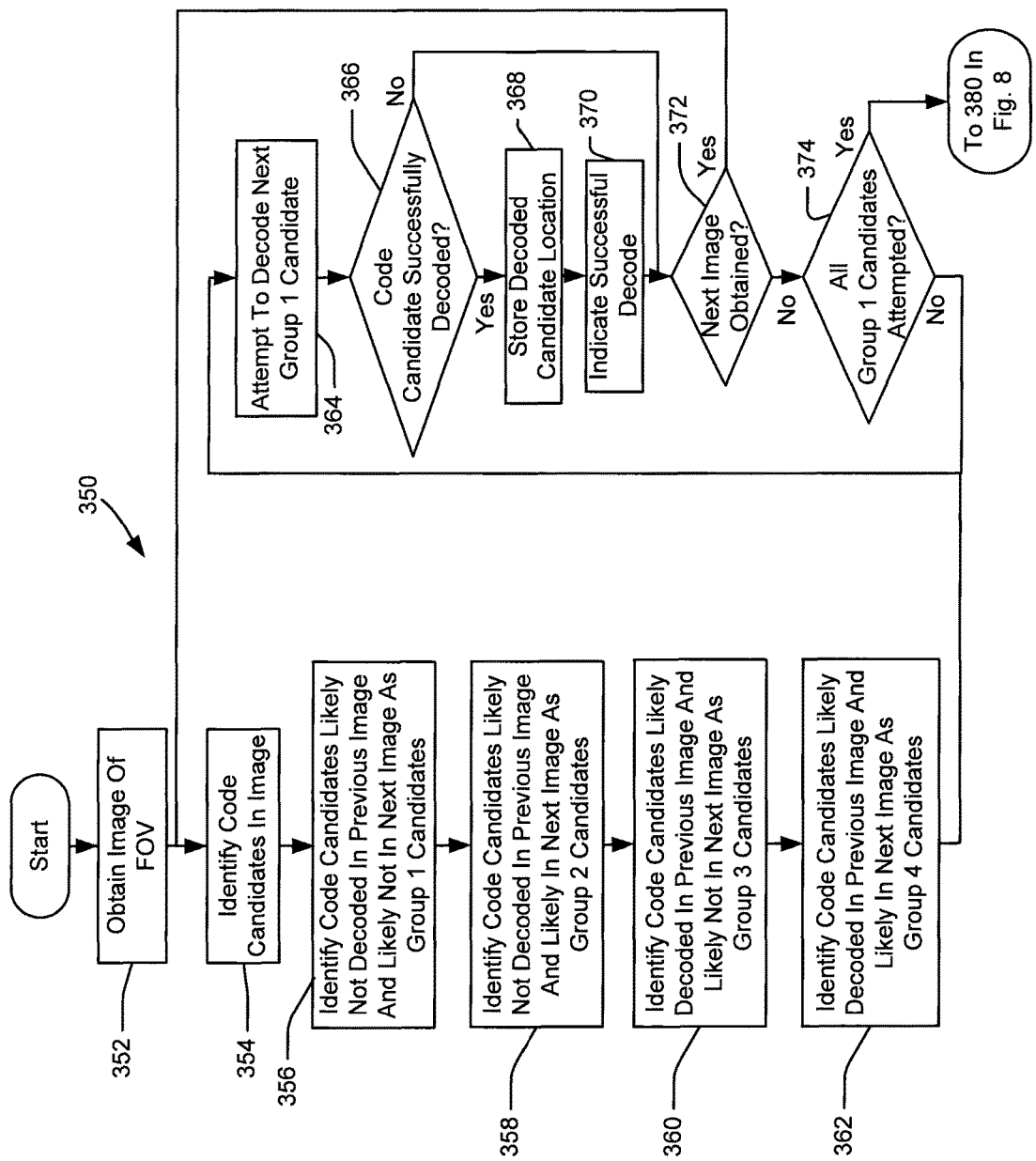
FIGS. 7 and 8 represent a single flow chart wherein a processor orders code candidates for decode attempts as a function of whether or not the code candidates were likely decoded in previously obtained images and whether or not the code candidates will likely appear in subsequent images.

In still other embodiments, processor 14 may be programmed to order code candidates as a function of both whether or not codes have likely been successfully decoded in prior images and whether or not code candidates will likely appear in subsequent images. To this end, referring to FIG. 7, another process 350 that may be performed by processor 14 that is consistent with at least some aspects of the present invention is illustrated. At block 352, processor 14 obtains an image from camera 22. At block 354, code candidates within the image are identified. At block 356, processor 14 identifies code candidates likely not decoded in at least one previous image and that will likely not appear in subsequent images as Group 1 candidates. At block 358, processor 14 identifies code candidates likely not decoded in previous images and that will likely appear in subsequent images as Group 2 candidates. At block 360, processor 14 identifies code candidates likely decoded in previous images and that will likely not appear in subsequent images as Group 3 candidates. At block 362, processor 14 identifies code candidates that have likely been decoded in previous images and that will likely appear in subsequent images as Group 4 candidates.

Continuing at block 364, processor 14 attempts to decode the next Group 1 code candidate (i.e., the next code candidate likely not decoded in a previous image and that will likely not appear in a subsequent image). Here, the first time through block 364 for an image, processor 14 attempts to decode a first Group 1 candidate, the second time through block 364, processor 14 attempts to decode a second Group 1 candidate, and so on.

At block 366, processor 14 determines whether or not a code candidate has been successfully decoded. Where the code candidate has been successfully decoded, control passes to block 368 and then to block 370 where the processor 14 stores the decoded candidate location and indicates a successful decode. After block 370, control passes to block 372. At block 366, if the code candidate has not been successfully decoded, control passes down to block 372.

At block 372, processor 14 determines whether or not a next image has been obtained. Where a next image has been obtained, control passes back up to block 354 where the process described above is repeated. Here, where a next image is obtained at block 372, all code candidates in the current image that the processor has not attempted to decode are discarded. At block 372, if a next image has not been obtained, control passes to block 374 where processor 14 determines whether or not all Group 1 candidates have been attempted. Where all Group 1 candidates have not been attempted, control passes back up to block 364 where the process described above continues. At block 374, once all group candidates have been attempted, control passes to block 380 in FIG. 8.

Figure 8:
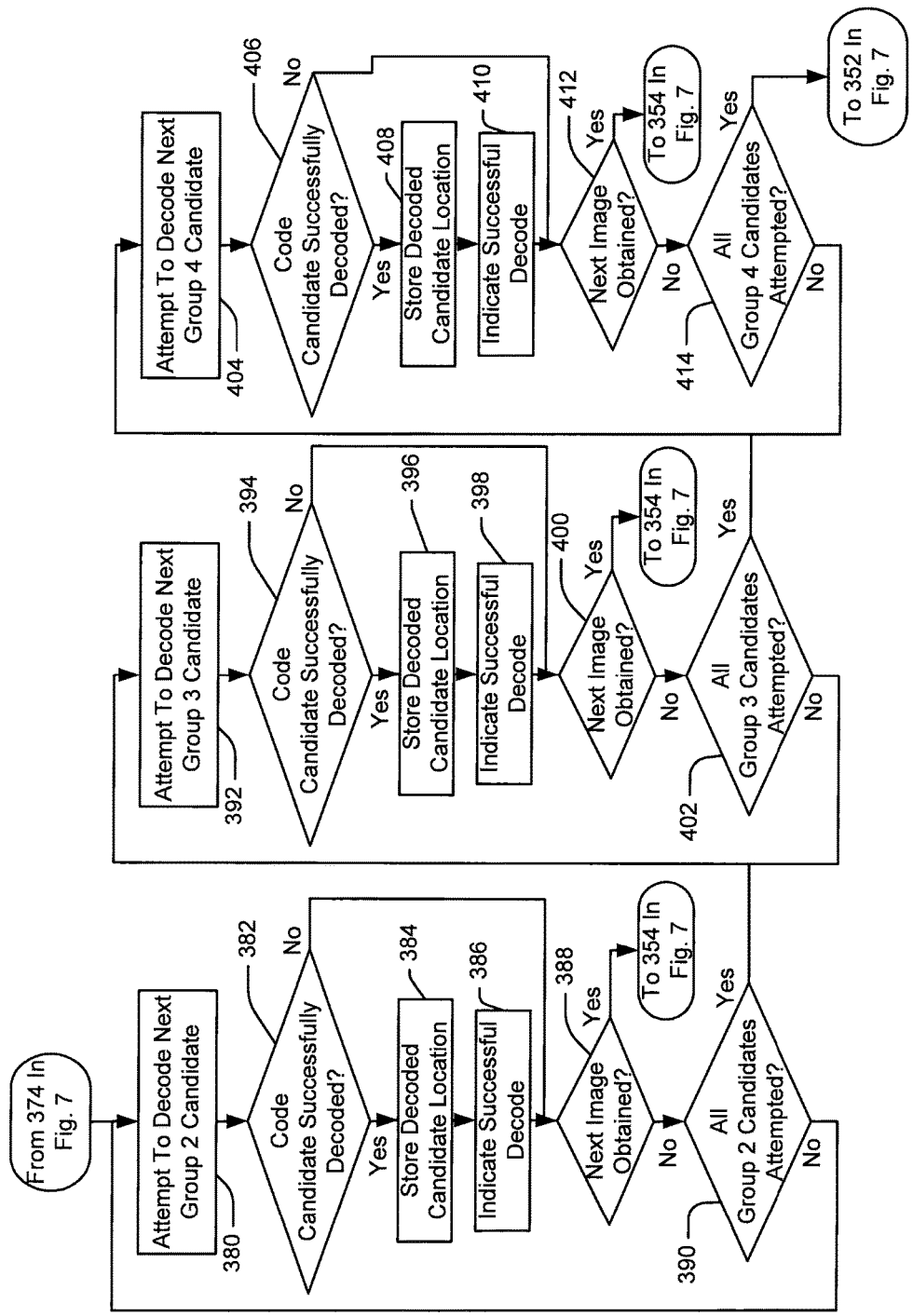

Referring now to FIG. 8, at block 380, processor 14 attempted to decode a next Group 2 candidate. Here, the first time through block 380, processor 14 attempts to decode the first Group 2 candidate, the second time through block 380, processor 14 attempts to decode the second Group 2 candidate and so on. At block 382, processor 14 determines whether or not the Group 2 candidate has been successfully decoded. Where the Group 2 candidate has been successfully decoded, control passes to blocks 384 and 386 where processor 14 stores the decoded candidate location and indicates a successful decode. After block 386, control passes to block 388. At 382, if the code candidate has not been successfully decoded, control passes to block 388.

At block 388, processor 14 determines whether or not a next image has been obtained from camera 22. Where a next image has been obtained from the camera, control passes back up to block 354 in FIG. 7 where the process described above continues. Here, if a next image is obtained at block 388, code candidates within the current image that the processor has not yet attempted to decode are discarded. At block 388, if a next image has not been obtained, control passes to block 390 where processor 14 determines whether or not all Group 2 candidates have been attempted. Where at least one Group 2 candidate has not been attempted, control passes back up to block 380 where the process described above is continued. If all of the Group 2 candidates have been attempted at block 390, control passes up to block 392.

At block 392, processor 14 attempts to decode the next Group 3 candidate. Here, the first time through block 392, processor 14 attempts to decode the first Group 3 candidate, the second time through block 392, processor 14 attempts to decode the second Group 3 candidate, and so on. At block 394, processor 14 determines whether or not the code candidate has been successfully decoded. Where the code candidate has been successfully decoded, control passes to blocks 396 and 398 where process 14 stores the decoded candidate location and indicates a successful decode. After block 398, control passes to block 400.

At block 400, processor 14 determines whether or not a next image has been obtained. If a next image has been obtained, control passes back up to block 354 in FIG. 7 and code candidates that the processor has not yet attempted to decode in the current image are discarded. If a next image has not been obtained at block 400, control passes to block 402. At block 402, processor 14 determines whether or not the processor has attempted to decode all of the Group 3 candidates. Where at least one Group 3 candidate has not been attempted, control passes back up to block 392 and the process described above continues. If all Group 3 candidates have been attempted, control passes to block 404.

At block 404, processor 14 attempts to decode the next Group 4 code candidate. Here, the first time through block 404, processor 14 attempts to decode the first Group 4 candidate, the second time through block 404, processor 14 attempts to decode the second Group 4 candidate and so on. At block 406, processor 14 determines whether or not the code candidate has been successfully decoded. Where the code candidate has been successfully decoded, control passes to blocks 408 and 410 where processor 14 stores the decoded candidate location and indicates a successful decode. After block 410, control passes to block 412. At block 406, if the code candidate has not been successfully decoded, control passes to block 412. At block 412, processor 14 determines whether or not a next image has been obtained from camera 22. Where a next image has been obtained, control passes to block 354 in FIG. 7 where the process described above continues and Group 4 code candidates that the processor has not attempted to decode are discarded. At block 412, if a next image has not been obtained, control passes down to block 414 where processor 414 determines whether or not the processor has attempted to decode all Group 4 candidates. Where at least one Group 4 candidate has not been attempted, control passes back up to block 404 where the process described above continues. If all Group 4 candidates have been attempted, control passes to block 352 in FIG. 7 where processor 14 waits to receive a next image from camera 22.

In some embodiments, it is contemplated that processor 14 may be programmed to attempt to decode a least a subset of the code candidates within an image using at least first and second different decode algorithms if possible prior to obtaining a next image. For instance, referring again to FIG. 2, the processor 14 may be programmed to initially attempt to decode all code candidates within the second region of interest 34 (i.e., attempt to decode all code candidates in the second half of the field of view that is adjacent the exit edge 38) using a relative simple decoding algorithm first and then, if time permits prior to a next new image event occurring, to attempt to decode all code candidates in the first region of interest 32 using a relatively simple and less time consuming decoding algorithm and, where time permits prior to the next image event occurring, to then attempt to decode code candidates in the first region of interest 32 using the more complex decode algorithm. Other sequences of applying two or more different decoding algorithms to different subsets of code candidates in an interleaved fashion are contemplated.

In still other embodiments, processor 14 may be programmed to order code candidates in different candidate groups as a function of locations within the camera's field of view. For instance, in the process described above with respect to FIGS. 7 and 8 where code candidates have been grouped into four different candidate groups based on whether or not the candidates have likely been previously decoded or not and whether or not the candidates will likely appear in subsequent images, candidates in group 1 (i.e., candidates likely not previously decoded and that will likely not appear in subsequent images) may be ordered with candidates closer to the entry edge of the field of view higher in the order than candidates spaced further from the entry edge. Candidates in the other groups 2 through 4 may be ordered in a similar fashion.

In still other embodiments, it is contemplated that when a next image event occurs prior to a processor attempting to decode all code candidates in a current image, the code candidates that have not been attempted may be stored for subsequent consideration. For instance, assume that there are ten code candidates in a first image and that the processor is only able to attempt to decode four of the ten candidates prior to obtaining a second image (i.e., prior to a next image event) so that at least initially, the processor does not attempt to decode six of the ten candidates in the first image. Also assume that there are only two code candidates in the second image and that the processor completes decode attempts of the two candidates prior to obtaining a third image so that the processor would have time to attempt to decode additional code candidates in the first image prior to obtaining the third image. In this case, the processor may be programmed to retrieve at least a subset of the code candidates from the first image and attempt to decode those candidates prior to obtaining the third image.

The subset of candidates selected to attempt to decode in a prior image may be a function of candidates that appeared in a subsequent image. For instance, in the above example where only two code candidates appear in the second image, processor 14 may be programmed to correlate the two candidates from the second image with two of the six code candidates that were not attempted in the first image and may attempt to decode the two candidates from the first image prior to receiving the third image.

It should be appreciated that different embodiments of the present invention take into account different factors when ordering code candidates within an obtained image to be attempted to be decoded by a processor. For instance, a processor may be programmed to factor in any one or a subset of the locations of code candidates within an obtained image, the travel direction of code candidates through a camera's field of view, the speed of travel of code candidates through the field of view, prior attempts to decode candidates in previous images, previous successful decode attempts for candidates, whether or not code candidates are new within a field of view or will be exiting the field of view, etc.

While the embodiments described above each require that code candidates that a processor has not attempted to decode be discarded when a new image is obtained, in at least some embodiments it is contemplated that, in at least some cases, new images may not be received until the processor attempts to decode all code candidates in at least a subset of the code candidates that appear in an image. For example, referring again to FIG. 7, where Group 1 candidates include code candidates that likely have not been decoded in previous images and likely will not appear in next images, processor 14 may be programmed to complete decode attempts for all Group 1 candidates prior to receiving a next image for processing even if the camera generates a next image before completing the attempts. In the alternative, if a next image is obtained prior to completing all attempts of Group 1 candidates, the next image may be stored or partially processed until the Group 1 candidates have all been attempted. In other embodiments, the processor may be programmed to require decode attempts for other subsets of code candidates prior to receiving or processing a next image.

While many of the embodiments described above stop attempting to decode code candidates when a next image is obtained, other next image events may cause the processor to stop attempting to decode candidates. For example, instead of waiting for a next image to be obtained, the processor 14 may be programmed to time out a period after which decode attempts for an image are discarded. Here, the time out period may be calculated to be a period similar to or slightly less than the period likely required for obtaining a next image. As another example, the processor 14 may be programmed to only attempt to decode a maximum number of code candidates where the maximum number is calculated to be completed prior to a next image being obtained. Here, the time out period and the maximum number of candidates to decode as well as the acquisition of a next image will generally be referred to as next image events which operate as processor triggers to discard code candidates that the processor has not attempted to decode or to complete only a subset of code candidates prior to processing a next obtained image. Other next image events are contemplated.

While all of the embodiments described above include processor 14 sequentially attempting to decode code candidates one at a time, it should be appreciated that in at least some embodiments the processor 14 may be able to simultaneously process two or more code candidates. Here, for instance, in at least some embodiments, where code candidates are divided into different groups by their locations within different regions of interest or as a function of other characteristics, the processor 14 may simultaneously attempt to decode all candidates in one group followed by attempts to decode all candidates in subsequent groups in a simultaneous fashion.

Referring once again to FIG. 2, while field of view 28 is divided into two different regions of interest 32 and 34 in the illustrated example, it should be appreciated that the field of view 28 may be divided into three or more fields of view or irregularly shaped fields of view, in any fashion.

While at least some of the processes described above forego processing of code candidates that have likely been decoded in previous images, in other embodiments the processor may only forego decoding attempts for codes that have likely previously been decoded more than once. For instance, the processor 14 may be programmed to require that a code have been successfully decoded twice or more prior to foregoing attempts for the same code in subsequent images.

In still other embodiments processor 14 may be programmed to forego attempts to decode at least some instances of a code candidate in some images where the processor has attempted to decode and failed to decode the candidate in one or more previous images. For instance, assume that a first code candidate has appeared in first and second consecutive images and has not been successfully decoded. In this case, while the first code candidate may appear is third, fourth, fifth and sixth subsequent images, processor 14 may be programmed to forego attempts to decode the first code candidate in the third, fourth and fifth images so that the processor 14 attempts next to decode the first code candidate in the sixth image. Skipping decode attempts may be advantageous as candidates often appear in consecutive images with similar characteristics which change to a greater degree in subsequent images when the objects and codes are at different locations within the camera's field of view. Thus, often it is more likely that the instance of the first code candidate in the sixth image will be more suitable for decoding than the instance in the third image after the processor has failed to decode the instances in the first and second images.

The particular embodiments disclosed above are illustrative only, as the invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims.

What is claimed is:

1. A method for decoding codes applied to objects that are moving with respect to a two dimensional field of view (FOV), the objects moving through the FOV such that objects enter the FOV along an entry edge and exit the FOV along an exit edge, the method comprising the steps of:
   providing a processor programmed to perform the steps of: obtaining images of the FOV;
   for each image:
   (i) identifying code candidates in at least portions of the image;
   (ii) ordering at least a subset of the code candidates for decoding in a candidate order wherein the candidate order is determined by identifying at least first and second regions of interest (ROIs) in the FOV and identifying code candidates in each of the at least first and second ROIs, and wherein the code candidates in the first ROI are ordered prior to the code candidates in the second ROI in the candidate order; and
   (iii) attempting to decode code candidates in the order specified by the candidate order.

2. The method in claim 1, wherein the step of ordering at least a subset of the code candidates further includes the step of identifying code candidates that will likely be outside the FOV when a next image is obtained and ordering the code candidates that will likely be outside the FOV when the next image is obtained near the beginning of the candidate order.

3. The method of claim 2, wherein the step of identifying code candidates that will likely be outside the FOV further includes the step of, for code candidates that will likely be outside the FOV when the next image is obtained, identifying code candidates that have likely been decoded in prior images and code candidates that likely have not been decoded in prior images and ordering the code candidates that likely have not been decoded in prior images prior to the code candidates that have likely been decoded in prior images.

4. The method of claim 2, wherein the step of ordering at least a subset of the code candidates further includes the steps of identifying code candidates that are likely new to the FOV and identifying code candidates that were likely in a prior image and that will likely be in the FOV when a subsequent image is obtained and ordering the code candidates that were likely in a prior image and that will likely be in the FOV when the subsequent image is obtained near the end of the candidate order and the code candidates that were likely in a prior image generally near the middle of the candidate order.

5. The method of claim 1, wherein the step of ordering at least a subset of the code candidates includes identifying code candidates that likely are new to the FOV near the beginning of the candidate order.

6. The method of claim 1, wherein the step of ordering at least a subset of the code candidates includes:
   identifying code candidates that are likely to be outside the FOV when a next image is obtained and that have likely not been decoded in a prior image as a first candidate subset;
   identifying code candidates that are likely to be outside the FOV when a next image is obtained and that have likely been decoded in a prior image as a second candidate subset;
   identifying code candidates that are likely to be in the FOV when a next image is obtained and that have likely not been decoded in a prior image as a third candidate subset;
   identifying code candidates that are likely to be in the FOV when a next image is obtained and that have likely been decoded in a prior image as a fourth candidate subset; and
   ordering the subsets so that the first candidate subset occurs prior to the second candidate subset, the second candidate subset occurs prior to the third candidate subset and the third candidate subset occurs prior to the fourth candidate subset.

7. The method of claim 1 wherein, when a new image is obtained, the method further includes discarding code candidates in the candidate order for which no attempt to decode has occurred.

8. The method of claim 1, wherein a conveyor system conveys objects at a conveyor speed in a first direction of travel through the FOV and wherein the candidate order is determined at least in part as a function of the conveyor speed.

9. The method of claim 1, wherein at least first and second different decode algorithms may be used to attempt to decode any of the code candidates, the method further including the step of assigning one of the first and second decode algorithms to each of at least a subset of the code candidates in the candidate order wherein the algorithm assigned to each candidate is at least in part a function of the candidate order.

10. The method of claim 9 further including the steps of identifying code candidates that were likely successfully decoded in prior images and code candidates that were likely not successfully decoded in prior images, the step of assigning first and second decode algorithms including assigning the decode algorithms at least in part as a function of whether or not code candidates were likely decoded in a prior image.

11. The method of claim 9, wherein the first decode algorithm requires more time than the second decode algorithm to complete.

12. The method of claim 1 further comprising, when a new image event occurs, foregoing attempt to decode at least a portion of the identified code candidates.

13. The method of claim 12, wherein the new image event occurs when a new image is obtained.

14. The method of claim 12, wherein the new image event occurs when an image acquisition period has lapsed.

15. The method of claim 1, wherein the first ROI is proximate one of the entry and exit edges of the FOV and the second ROI is proximate the other of the entry and exit edges of the FOV.

16. An apparatus for decoding codes applied to objects that are moving with respect to a two dimensional field of view (FOV), the objects moving in through the FOV such that objects enter the FOV along an entry edge and exit the FOV along an exit edge, the apparatus comprising:
   a processor programmed to perform the steps of: obtaining images of the FOV;
   for each image:
   identifying code candidates in at least portions of the image;
   (ii) ordering at least a subset of the code candidates for decoding in a candidate order wherein the candidate order is determined by identifying at least first and second regions of interest (ROIs) in the FOV and identifying code candidates in each of the at least first and second ROIs, and ordering the code candidates depending on whether they are in the first ROI or the second ROI; and
   (iii) attempting to decode code candidates in the order specified by the candidate order.

17. The apparatus in claim 16, wherein a conveyor system conveys objects at a conveyor speed in a first direction of travel through the FOV and wherein the candidate order is determined at least in part as a function of the conveyor speed.

18. The apparatus of claim 16, wherein the first ROI is proximate one of the entry and exit edges of the FOV and the second ROI is proximate the other of the entry and exit edges of the FOV.

19. A method for decoding codes applied to objects that are moving with respect to a two dimensional field of view (FOV), the objects moving through the FOV such that a sensor generates a first image and a subsequent second image, wherein an exit edge of the first image is proximate to an entry edge of the second image, respectively, the method comprising the steps of:
   providing a processor programmed to perform the steps of: obtaining an image of the FOV;
   for each image:
   (i) identifying code candidates in at least portions of the first image;
   (ii) attempting to decode code candidates in the first image a first time;
   (iv) after attempting to decode code candidates in the first image, attempting to decode code candidates in the second image; and (v) after attempting to decode code candidates in the second image, attempting a second time to decode code candidates in the first image.

* * * * *